Jan. 20, 1970 S. NICKO 3,490,483
TAPPING PIPE UNIT FOR BEVERAGE CONTAINERS
Filed Dec. 5, 1966

INVENTOR
Stanley Nicko
by McDougall, Hersh, Scott
and Ladd
Att'ys

United States Patent Office 3,490,483
Patented Jan. 20, 1970

3,490,483
TAPPING PIPE UNIT FOR BEVERAGE CONTAINERS
Stanley Nicko, Chicago, Ill., assignor to Flake Ice Machines, Inc., Chicago, Ill., a corporation of Illinois
Filed Dec. 5, 1966, Ser. No. 599,019
Int. Cl. B67d 5/54; F04f 1/00; B65d 83/14
U.S. Cl. 137—212                 1 Claim

ABSTRACT OF THE DISCLOSURE

Inner and outer coaxial tapping pipes are removably mounted on a T-fitting, to provide for complete disassembly and easy cleaning of the tapping pipe unit. The T-fitting has upper and lower legs and a side leg. The lower leg has an enlarged bore to receive the outer tapping pipe, which is secured to the lower leg by a compression collar and nut. A hose fitting for introducing carbon dioxide is connected to the side leg by a compression nut, with a sealing ring between the hose fitting and the side leg. The inner pipe has a flared upper end flange and extends downwardly therefrom through both the upper and lower legs. A sealing ring is disposed between the flange and the upper leg. A second hose fitting, serving as an outlet for the beverage, is compressed against the flange by a compression nut.

---

This invention relates to a new and improved tapping pipe unit for use with cans or other containers adapted to hold beverages, particularly carbonated beverages such as beer or the like.

One object of the present invention is to provide a new and improved tapping pipe unit which may easily be disassembled so that all parts of the tapping pipe unit may be cleaned very thoroughly and easily.

A further object is to provide such a new and improved tapping pipe unit which is generally of the coaxial type, and disclosed in the applicant's prior patent, No. 3,240,302, patented Mar. 15, 1966.

Thus, it is a further object of the present invention to provide a new and improved tapping pipe unit of the foregoing character, including an inner pipe for withdrawing the beverage from the container, and an outer pipe, co-axially received around the inner pipe, for introducing carbon dioxide or other gas into the container, to provide pressure for dispensing the beverage.

Another object is to provide a new and improved tapping pipe unit of the foregoing character, utilizing a T-fitting for supporting and sealing both the inner and outer pipes, in such a manner that the pipes may readily be disassembled for thorough cleaning.

Another object is to provide a tapping pipe unit which is convenient and highly serviceable, yet is easy to manufacture and low in cost.

Further objects and advantages of the present invention will appear from the following description, taken with the accompanying drawings, in which:

FIG. 1 is a fragmentary elevational section showing a tapping pipe unit to be described as an illustrative embodiment of the present invention, the unit being shown in its position of use, inserted into a beverage container or the like.

Figure 1:
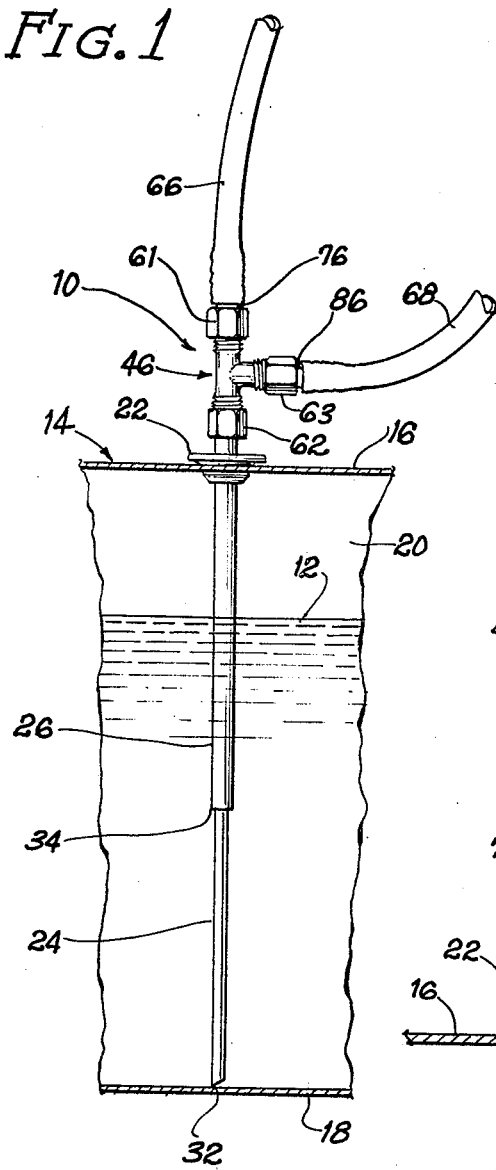
Figure 2:
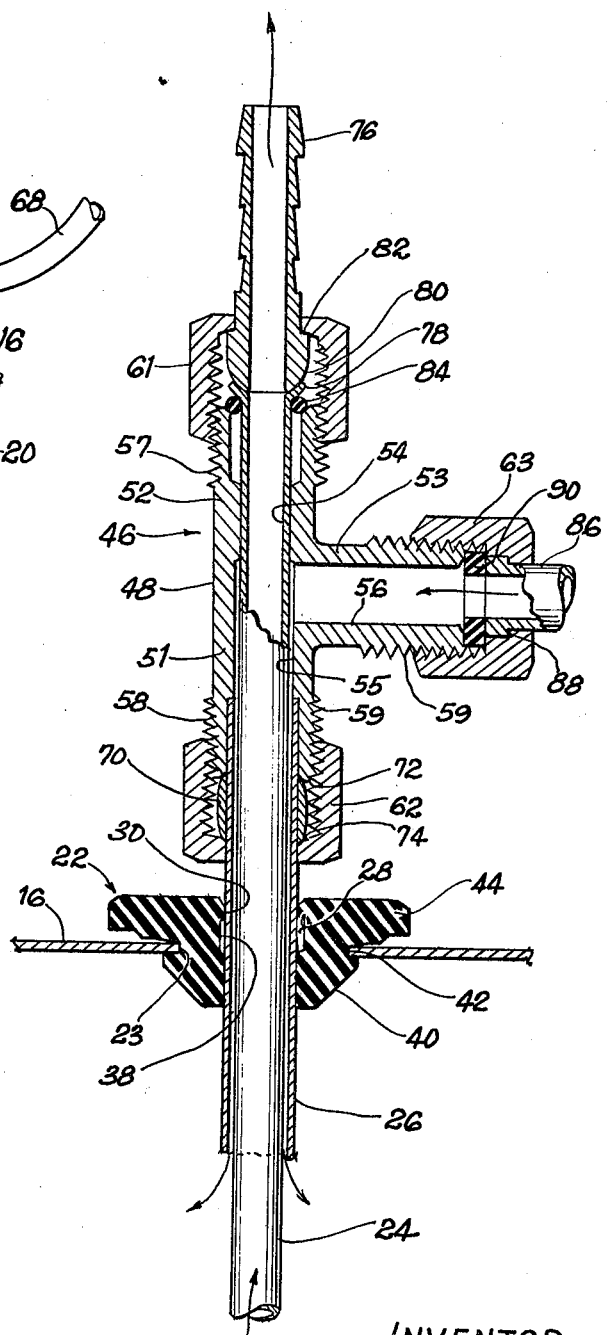
FIG. 2 is a fragmentary enlarged longitudinal section taken through the tapping pipe unit.

As already indicated, the drawings illustrate a tapping pipe unit 10 for use in dispensing a beverage or other liquid 12 from a container 14. The illustrated container 14 is in the form of a metal can having top and bottom walls 16 and 18, and a generally cylindrical side wall 20. However, the tapping pipe 10 may be used in connection with various other suitable types of containers, such as bottles or the like.

As shown in the drawings, the tapping pipe unit 10 is adapted to be inserted through a soft resilient tapping plug or grommet 22, inserted into a circular opening 23 which is formed in the top wall 16 of the container 14. The plug 22 is preferably made of natural or synthetic rubber, but may also be made of various plastics. It will be understood that the plug 22 provides a seal between the tapping pipe unit 10 and the top wall 16, so as to prevent leakage of the beverage from the container, while also preventing loss of carbonation from the beverage.

The tapping pipe unit 10 comprises inner and outer tapping pipes 24 and 26, both of which are adapted to be inserted through the plug 12. The outer pipe 26 is coaxially mounted around the inner pipe 24. One pipe carries the beverage out of the container, while the other pipe is employed to introduce carbon dioxide, air or some other gas into the container. The pressure of the carbon dioxide or other gas is employed to dispense the beverage from the container. The use of carbon dioxide under pressure is particularly desirable, because the carbonation of the beverage is thereby maintained and even improved. It is preferred to dispense the beverage through the inner pipe 24, while introducing the carbon dioxide through the outer pipe 26.

The outer pipe 24 is preferably long enough to extend downwardly to a point just above the lower wall 18 of the container, so that virtually all of the beverage may be dispensed. The length of the outer pipe 26 may be sufficient to introduce the carbon dioxide into the beverage, so that the carbon dioxide will bubble upwardly through the beverage. The bubbling or percolation of the carbon dioxide normally improves the carbonation of the beverage. However, the outer pipe 26 may also be somewhat shorter so that the carbon dioxide is introduced into the container 14 above the level of the beverage 12.

The rubber plug 22 is preferably of the general type disclosed and claimed in the applicant's prior patent, No. 3,240,392. Thus, the plug 22 preferably comprises a diaphragm 28 which is initially imperforate, so that the plug serves initially as a stopper or seal for the container 14. The diaphragm 28 initially extends across a bore 30, formed in the plug 22.

At least one of the pipes 24 and 26 is preferably formed with a sharp point 32, adapted to pierce the diaphragm 28. As shown, the piercing point 32 is formed on the inner pipe 24, which is the first to be inserted through the plug 12, inasmuch as the illustrated inner pipe 24 extends below the end of the outer pipe 26. The outer pipe 26 may also be formed with a piercing point, particularly when the outer pipe extends downwardly to approximately the same level as the inner pipe 24. As shown, the outer pipe 26 is above the level of the piercing point 32 and is formed with a lower edge 34 which may be easily pushed through the plug 22, after the diaphragm 28 has been pierced by the point 32 on the inner pipe 24.

The plug 22 is formed with an annular recess 38 of enlarged diameter, just below the initial position of the diaphragm 28. When the diaphragm 28 is pierced by the pipes 24 and 26, the diaphragm is folded downwardly into the recess 38. The recess 38 thus affords room for the pierced diaphragm, so that it remains in the plug 22, rather than being severed and pushed downwardly into the beverage 12 in the container 14.

The illustrated plug 22 has a downwardly tapering frusto-conical nose portion 40 which may be forced through the opening 23. An annular groove 42 is formed in the plug 22 above the nose portion 40, to receive the top wall 16 of the container 14. It will be understood that the plug 22 fits tightly in the opening 23, so that a seal will be formed between the plug and the top wall 16. Above the groove 42, the plug 22 is preferably formed with an enlarged flange 44 which retains the plug in the opening 23 when the tapping pipe unit 10 is inserted through the plug.

Both the inner and outer pipes 24 and 26 of the tapping pipe unit 10 are preferably mounted in a T-fitting 46 which makes it possible to disassemble the tapping pipe unit 10 for thorough and easy cleaning of all of the parts. Most of the components of the T-fitting 46 may very advantageously be of standard or stock construction, readily available from numerous sources. Thus, the illustrated T-fitting 46 comprises a T-shaped tubular body 48 having three legs 51, 52 and 53. The legs 51 and 52 are aligned with each other but extend in opposite directions. The leg 53 is generally at right angles to the legs 51 and 52. Interconnected bores 54, 55 and 56 are formed in the legs 51, 52 and 53.

It will be seen that the legs 51-53 are formed with externally threaded end portions 57, 58 and 59, adapted to receive annular connecting nuts or collars 61, 62 and 63.

In general, the lower leg 51 of the T-fitting 46 is connected to the outer pipe 26. The upper leg 52 is employed to form a connection between the inner pipe 24 and a hose or other conduit 66 through which the beverage is dispensed. The side leg 53 is employed to form a connection between the outer pipe 26 and another hose or conduit 68, through which carbon dioxide or the like is introduced into the container 14.

In the illustrated construction, a known type of compression joint is formed between the lower leg 51 and the upper end of the outer pipe 26. It will be seen that a tapered compression collar or bushing 70 is mounted around the outer pipe or tube 26 and is compressed between the tubular leg 51 and the nut 62. The compression bushing 70 is of the type which is tapered from the middle toward both ends. Internal frusto-conical end surfaces 72 and 74 are formed on the leg 51 and the nut 62 to engage the opposite ends of the bushing 70. Thus, the tightening of the nut 62 compresses the ends of the bushing 70 against the outer pipe 26 so as to form a tightly sealed joint between the leg 51 and the outer pipe 26.

The illustrated hose 66 is stretched around a hose nipple 76 which is connected to the upper end of the inner pipe 24. It will be seen that the inner pipe 24 has a flared or shouldered upper end portion 78. A rounded end portion 80 is formed on the lower end of the hose nipple 76 to engage the flared portion 78. The hose nipple 76 extends through the nut 61 and is formed with a shoulder 82 adapted to be engaged by the nut, so that the tightening of the nut will compress the rounded end portion 80 of the nipple against the flared ortion 78. A soft resilient sealing ring 84 is provided around the tube 24 so as to form a seal between the flared portion 88 and the upper end of the leg 52. The illustrated sealing ring 84 is circular in cross section.

Another hose nipple 86 is provided to receive the hose 68. The hose nipple 86 extends through the nut 83 and is formed with a shoulder 88 for engagement by the nut. A sealing ring 90 is interposed between the outer end of the leg 53 and the inner end of the hose nipple 86. The tightening of the nut 63 compresses the hose nipple 86 against the sealing ring 90 so as to form a tight joint.

SUMMARY OF OPERATION

The operation and use of the tapping pipe unit 10 will already be evident, but it is believed that brief summary may prove to be helpful. The tapping pipe unit 10 is used by forcing the piercing point 32 through the diaphragm 78 in the rubber plug 22, so that both the inner and outer pipes 24 and 26 may be pushed through the plug and into the beverage container 14. Carbon dioxide or some other gas is forced into the container 14 through the hose 68, the T-fitting 48, and the outer pipe 26. The pressure of the carbon dioxide forces the beverage out of the container 14 through the inner pipe 24, the hose nipple 76 and the hose 66. It will be understood that the hose may be connected to a valve or faucet for controlling the outward flow of the beverage.

When the tapping pipe unit 48 is to be cleaned, it is first withdrawn from the container 14. The hoses 66 and 68 may then be disconnected from the nipples 76 and 86. The outer pipe 26 is removed by unscrewing the nut 62, whereupon the outer pipe 26 may be withdrawn from the T-fitting 48. The nut 61 is then unscrewed so that the lose nipple 76 may be removed. The inner pipe 26 may then be withdrawn from the T-fitting 48. The nut 63 is unscrewed so that the hose nipple 86 may be removed.

It is then an easy matter to clean the separate parts by conventional procedures. The parts are then reassembled by reversing the disassembly procedure.

The T-fitting 48 may be a stock or standard item which is readily available at low cost from various sources. The use of the T-fitting reduces the cost of the tapping pipe unit and makes it easy to provide replacement parts, if needed.

The tapping pipe unit provides a high degree of sanitation because of the ease with which the unit may be disassembled and cleaned. Thus, the tapping pipe unit is able to meet the stringent requirements of cleanliness imposed by many health codes.

Various other modifications, alternative constructions, and equivalents may be employed without departing from the true spirit and scope of the invention, as exemplified in the foregoing description and defined in the following claim.

I claim:
1. A tapping pipe unit for beverage containers or the like,
    comprising a hollow tubular T-fitting having a one-piece body with integral upper and lower legs and an integral side leg thereon,
    said T-fitting having common passage means therein extending through said body and all of said legs,
    a one-piece cylindrical outer tapping pipe removably connected to said lower leg,
    said outer tapping pipe having annular compression collar means thereon in sealing engagement with said lower leg,
    a lower compression nut received around said outer pipe for compressing said collar means against said lower leg,
    said lower leg having a threaded portion for receiving said lower compression nut,
    a one-piece cylindrical inner tapping pipe having an outside diameter less than the inside diameter of said outer tapping pipe,
    said upper leg having a guide bore formed therein for receiving and centering said inner pipe,
    said inner pipe extending downwardly through said guide bore and also through said body and said lower leg,
    said inner tapping pipe being coaxially received within said outer tapping pipe and extending downwardly therethrough,
    said inner tapping pipe having its upper end formed with an outwardly flared annular flange,
    a sealing ring disposed between said upper leg and the lower side of said flange,
    an upper connecting tube having a lower end portion engaging the upper side of said flange,
    said upper leg having an upwardly facing annular shoulder for engaging said sealing ring,
    an upper clamping nut received around said upper connecting tube for clamping said tube against said flange,
    said upper connecting tube having annular shoulder means thereon for engaging said clamping nut,
    said upper leg having a threaded portion for receiving said upper clamping nut, said upper clamping nut being effective to clamp said upper connecting tube against said flange while also compressing said sealing ring between said flange and said annular shoulder on said upper leg, a side connecting tube removably connected to said side leg, and a side clamping nut received around said side connecting tube for clamping said side connecting tube against said side leg, said side connecting tube having shoulder means for engaging said side clamping nut, said side leg having a threaded portion for receiving said side clamping nut.

References Cited

UNITED STATES PATENTS

| | | | |
|---|---|---|---|
| 711,162 | 10/1902 | Holbach | 137—212 |
| 1,421,319 | 6/1922 | Stern | 222—400.7 |
| 3,353,724 | 11/1967 | Johnston | 222—400.7 |

ALAN COHAN, Primary Examiner

U.S. Cl. X.R.

222—400.7